United States Patent [19]
Martin

[11] Patent Number: 5,365,785
[45] Date of Patent: Nov. 22, 1994

[54] SUBMERSIBLE METER REGISTER CASE AND ASSEMBLY

[75] Inventor: James F. Martin, West Greenwich, R.I.

[73] Assignee: Grinnell Corporation, Cranston, R.I.

[21] Appl. No.: 928,959

[22] Filed: Aug. 12, 1992

Related U.S. Application Data

[63] Continuation-in-part of Ser. No. 900,141, Jun. 17, 1992, abandoned.

[51] Int. Cl.⁵ ............................................. G01F 15/14
[52] U.S. Cl. .................................................... 73/431
[58] Field of Search ............ 73/431, 201, 272, 272 A, 73/273, 274, 861.87, 861.94

[56] References Cited

U.S. PATENT DOCUMENTS

| | | | |
|---|---|---|---|
| 2,773,388 | 12/1956 | Prosser | 73/431 |
| 3,100,999 | 8/1963 | Andersen, Jr. | 73/431 |
| 3,203,244 | 8/1965 | Alinari | 73/431 |
| 3,228,243 | 1/1966 | Woolf | 73/272 A |
| 3,308,664 | 3/1967 | Kullman | |
| 3,659,457 | 5/1972 | Ostrowski | 73/431 |
| 3,720,106 | 3/1973 | Varga | |
| 3,802,266 | 4/1974 | Rittenhouse et al. | |
| 5,079,953 | 1/1992 | Martin et al. | 73/431 |

FOREIGN PATENT DOCUMENTS 7502351  9/1975  United Kingdom .

OTHER PUBLICATIONS

"Measuring the Water of the World", Kent Meters, Inc. (dated Jun. 1988).
"Water Measurement Equipment and Systems", Sensus Technologies Inc. (excerpt).
"Generator Remote Meter Reading Registers", Hersey Products Inc. (dated Feb. 1984).

*Primary Examiner*—Robert Raevis
*Attorney, Agent, or Firm*—Fish & Richardson

[57] ABSTRACT

A fluid meter totalizing register assembly suitable for submerged service includes a fluid meter totalizing register and a register case. The register case has a housing comprising a water impermeable elastomeric material defining at least one wall of a cavity for receiving the fluid meter totalizing register. The register case includes a transparent lens of water impermeable material closing a top opening of the cavity in a water-tight seal with the wall of the housing, and a magnetic-force transmitting element of water impermeable material closing a bottom opening of the cavity in a water tight seal with the wall of the housing. The register includes a rotatable register element disposed within the cavity adjacent an inner surface of the magnetic-force transmitting element. The rotatable register element is driven by magnetic coupling with a rotatable meter element disposed adjacent an opposite, outer surface of the magnetic-force transmitting element.

34 Claims, 1 Drawing Sheet

SUBMERSIBLE METER REGISTER CASE AND ASSEMBLY

This application is a continuation-in-part of U.S. Ser. No. 07/900,141, filed Jun. 17, 1992, now abandoned.

BACKGROUND OF THE INVENTION

The present invention relates to cases or housings for fluid meter totalizing registers.

For the purpose of this application, a water meter is a device containing an element for conversion of water volumetric flow motion to rotational shaft motion. A totalizing register is most often in the form of a gearbox that mechanically converts this shaft motion to an indication of volumetric consumption, e.g., gallons.

It has been known to achieve transfer of meter shaft rotation information to a fluid meter totalizing register through a magnetic coupling. For example, a face magnet on the meter output shaft is magnetically coupled to a face magnet on the register input shaft, with a magnetically inert barrier surface therebetween, and the magnetic attraction between the opposed pair of magnets is sufficient for transmission of the torque required to turn the register gearbox without significant slippage.

In many applications, the register is frequently operated totally submerged in groundwater, and a register case must be truly impermeable to moisture penetration in order for the register to function accurately and reliably over an extended period of time. As a result, prior art register cases often include features intended to protect the internal parts from corrosive attack by the surrounding elements. However, modern meters increasingly employ an electrical sensor inside the register for transmission of signals to a remote counter some distance away, requiring that electrical lead wires connecting the sensor and the remote counter pass through the register case, thus adversely affecting the integrity of the register case seal. As a result, prior art register cases with electrical lead wires of this type typically must also include complicated assemblies of gaskets, fittings and adapters, which can be both unreliable and costly.

SUMMARY OF THE INVENTION

According to one aspect of the invention, a register case for a fluid meter totalizing register suitable for submerged service comprises a housing comprising a water impermeable elastomeric material defining at least one wall of a cavity for receiving a fluid meter totalizing register, the cavity having a top opening and a bottom opening, a transparent lens closing the top opening in a water-tight seal with the wall of the housing, and a magnetic-force transmitting element of water impermeable material closing the bottom opening in a water tight seal with the wall of the housing. The register has a rotatable register element disposable within the cavity adjacent an inner surface of the conducting transmitting element, the rotatable register element adapted to be driven by magnetic coupling with a rotatable meter element disposed adjacent an opposite, outer surface of the magnetic-force- transmitting element.

Preferred embodiments of this aspect of the invention may include one or more of the following features. The elastomeric material is rubber, e.g., ethylene propylene rubber. The housing is formed by molding. The housing and the magnetic-force- transmitting element are integrally joined, e.g., by molding, to provide a water-tight seal. The housing, within the cavity, defines a first groove sized and constructed for receiving a base flange of the register, the first groove adapted for engagement with the flange in a manner to secure and position the register within the cavity. The lens defines a lens flange, and the housing, within the cavity, defines a second groove sized and constructed for receiving the flange of the lens in water-tight engagement. Preferably, the register case further comprises a first means for clamping the housing about the lens flange to form a water-tight seal. The transparent lens is formed of material, e.g., glass, resistant to clouding due to prolonged exposure to groundwater and trace chemicals therein. The magnetic-force transmitting element is formed of a magnetically inert material, e.g., a copper alloy. The housing comprises a portion defining a passageway for electrical wires from within the cavity. Preferably, the register case further comprises a second means for clamping the portion defining the passageway about the electrical wires to form a water-tight seal. The register may further comprise a sealant, e.g., caulking compound, or packing material to enhance the water-tight seal.

According to another aspect of the invention, a fluid meter totalizing register assembly suitable for submerged service comprises a fluid meter totalizing register, and a register case. The register case comprises a housing of water impermeable elastomeric material defining at least one wall of a cavity for receiving the fluid meter totalizing register, the cavity having a top opening and a bottom opening, a transparent lens closing the top opening in a water-tight seal with the wall of the housing, and a magnetic-force transmitting element of water impermeable material closing the bottom opening in a water-tight seal with the wall of the housing. The fluid meter totalizing register comprises a rotatable register element disposed within the cavity adjacent an inner surface of the magnetic-force transmitting element, the rotatable register element adapted to be driven by magnetic coupling with a rotatable meter element disposed adjacent an opposite, outer surface of the magnetic-force transmitting element.

Preferred embodiments of this aspect of the invention may include one or more of the following features. The elastomeric material is rubber, e.g., ethylene propylene rubber. The housing is formed by molding. The housing and the magnetic-force transmitting element are integrally joined, e.g., by molding, to provide a water-tight seal. The register has a base flange, and the housing, within the cavity, defines a first groove sized and constructed for receiving the base flange of the register, the first groove adapted for engagement with the base flange in a manner to secure and position the register within the cavity. The lens defines a lens flange, and the housing, within the cavity, defines an annulus sized and constructed for receiving the flange of the lens in water-tight engagement. Preferably, the register assembly further comprises first means for clamping the housing about the lens flange to form a water-tight seal. The transparent lens is formed of material, e.g., glass, resistant to clouding due to prolonged exposure to groundwater and trace chemicals therein. The magnetic-force transmitting element is formed of a magnetically inert material, e.g., copper alloy. The housing comprises a portion defining a passageway for electrical wires from within the cavity. Preferably, the register assembly further comprises second means for clamping the portion defining the passageway about the electrical wires to form a water-tight seal. The register may further comprise a sealant, e.g., caulking compound, or packing material disposed about the wires in the passageway to enhance the water-tight seal.

Objectives of the invention include to provide a simple, economical totalizing register case truly impermeable to moisture penetration and therefore suitable for submerged operation without failure.

These and other features and advantages of the invention will be seen from the following description of a presently preferred embodiment, and from the claims.

DESCRIPTION OF THE PREFERRED EMBODIMENT

Figure 1:
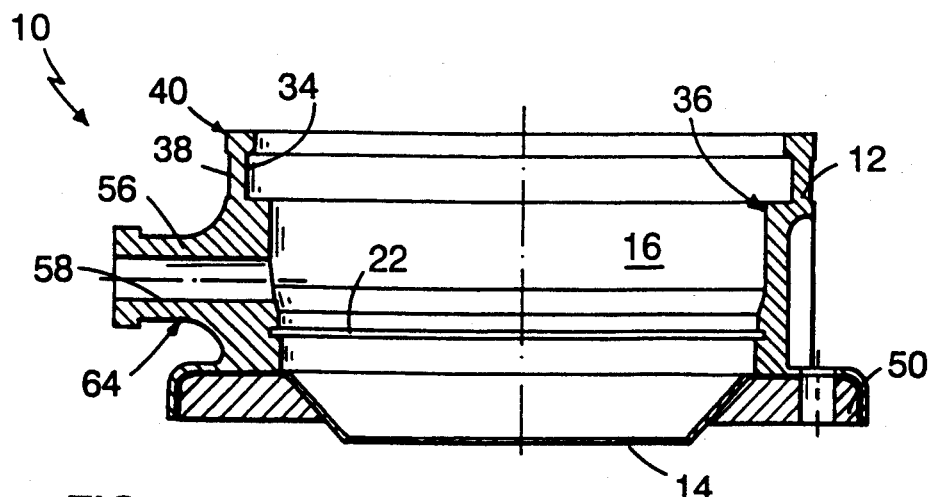
FIG. 1 is a cross-sectional view of a register case of the invention.

Referring to FIG. 1, a register case 10 of the invention consists of a body 12 formed of a suitable elastomeric material, e.g. solid molded ethylene propylene rubber, that is resistant to groundwater and trace chemicals found therein, molded about a thin copper alloy membrane plate 14. The body defines a cavity 16 that is open at the top, with a bottom opening that is closed by the plate 14.

Figure 2:
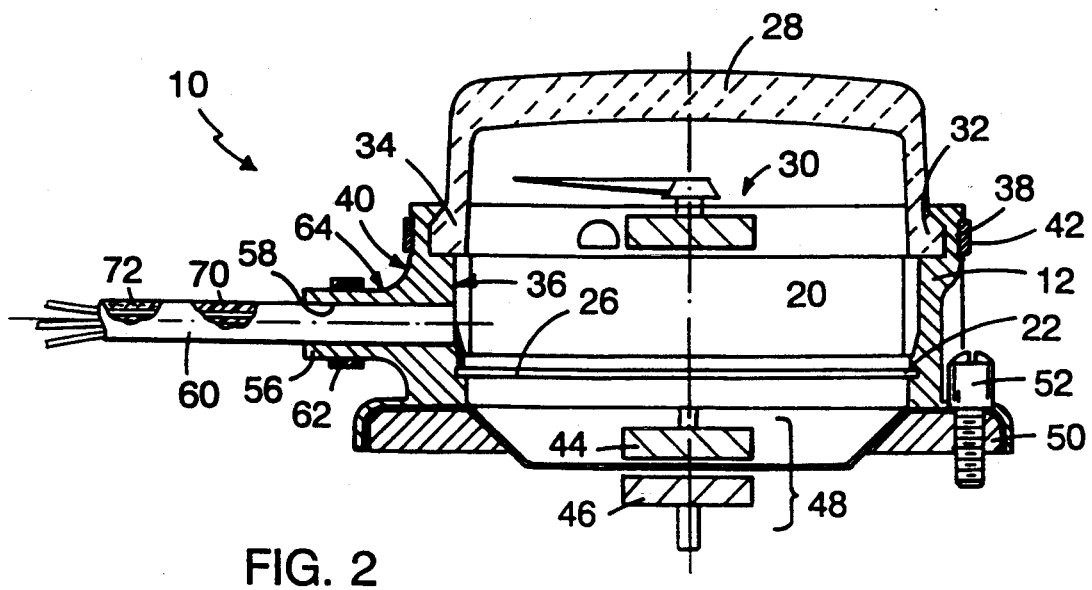
FIG. 2 is a similar view of a fluid meter totalizing register assembly of the invention.

Referring also to FIG. 2, a fluid meter totalizing register 20 is disposed within the cavity 16, mounted in a groove 22 molded about the inside circumference of the body 12, the groove 22 being sized to receive a flange 26 formed at the base of the register. In this manner, the register 20 is securely fastened into the register case 10 in the exact position required, without need for additional fasteners commonly required in prior art devices.

A molded, water impermeable glass register lens 28 is disposed over the reading display surface 30 of the register 20. The lens 28 is sealingly mounted to the register case 10 by engagement of lens flange 32 within annulus 34 defined by the inner surface 36 of the cavity 16, about the top of register case 10, the annulus 34 having a shape molded to conform to the shape of lens flange 32.

The body 12 also defines a shallow, circumferential annulus 38 about the outside surface 40 of register case 10, opposite the annulus 34 defined by the inner surface 36. The annulus 38 is configured to receive a band-type clamp 42 which can be tightened about the register case 10 in the region of the register lens flange 32, thus to provide a water-tight seal. In the preferred embodiment described, band-type clamp 42 is a commercially available stainless steel wrap-tie often used in packaging and cable-tie applications, which is applied with the manufacturer's tool, either manually or automatically, to result in significant clamping pressure between the relatively soft rubber of register case 10 in the region of the annuli 34, 38 and the lens flange 32. In this manner, the seal between the register lens 28 and the body 12 is positively secured, without need of additional, discrete seals requiring expensive machined grooves. This arrangement also makes unnecessary the use of messy sealants which can frequently leak due to incomplete coverage or cracking due to age.

The plate 14, which is preferably made of a copper alloy material, forms a thin, impermeable barrier separating the driven register magnet 44 from the driving meter magnet 46. The magnet pair forms a mechanical coupling 48 which transmits the meter output in revolutions per minute ("RPM") into the register gearset (not shown). Plate 14 is sufficiently thin to minimize the gap between the opposed face surfaces of the register magnet 44 and meter magnet 46, thereby maximizing torque transmission therebetween. Plate 14 also provides structural support for register case mounting flange 50, and acts as a bezel for mounting screws 52, provided for mounting the register case upon a water meter (not shown). Also, molding the rubber register case 10 around plate 14 results in a leak-tight seal, with no leak paths through the bottom opening of the register case.

The body 12 of the register case 10 further includes a portion 56 defining an internal passageway 58 for routing of electrical signal wires 60 into the case for attachment to a remote sensor circuit (not shown). A small band clamp 62 is crimped around the outside surface 64 of portion 56, thereby compressing and sealing the relatively soft rubber material of the body 12 around wires 60. A sealant, e.g., caulking compound, or packing material may be used between the inside wall of the passageway 58 and the wires to enhance the water-tight seal.

In the register case of the present invention, the meter magnet 46 operates in the ambient environment. However, the register magnet 44 is separated from the meter magnet 46 by the thin plate 14 which forms part of the register case 10. The thin plate 14 allows for close spacing of the magnetic coupling 48, as required for torque transmission, but primarily forms also the basis for totally enclosing the register 20 in the hermetically sealed environment of cavity 16.

Most remote register cases manufactured today are composed of cases of thermoplastic materials, with lenses sealed with rubber O-rings. These thermoplastic materials will often absorb water over time, causing the lens to cloud and permeating the register interior, eventually leading to mechanical and/or electrical malfunction.

In the register case of the invention, the glass register lens 28 does not absorb moisture and remains crystal clear. The ethylene propylene rubber material of the register case 10 may swell somewhat, but will not leak, and all components are highly resistant to attack by most trace chemicals likely encountered in service.

Other embodiments are within the following claims. For example, other types of lens clamps and clamp materials may be utilized in place of stainless steel band-type clamp 42 described above, including, e.g., worm gear or ear-type hose clamps formed of stainless steel, plastic or nylon material, as long as the clamp exerts sufficient circumferential pressure on the joint between register lens 28 and register case body 12 to cause the resilient rubber material to deform around the flange 32 and create a water-tight seal. Also, the wires 60 may be sealed, e.g. with sealant such as caulking compound 70, and/or packing 72, or vulcanized to the register case portion 56, thereby eliminating the need for an external clamp to seal their connection through the housing. In addition, the housing may be molded of other water impermeable elastomeric materials such as butyl or fluorocarbon polymers and, the housing may be fabricated from a combination of the relatively soft elastomeric material described in this invention and metal or thermoplastic. Lastly, the plate 14 may be fabricated, for example, of a non-magnetic nickel alloy rather than the copper alloy of the preferred embodiment.

What is claimed is:

1. A register case for a fluid meter totalizing register suitable for submerged service, comprising:
   a housing comprising a water impermeable elastomeric material defining at least one wall of a cavity, said cavity having a top opening and a bottom opening and defining a volume therebetween for receiving and containing therewithin, in a region in between said top opening and said bottom opening, a fluid meter totalizing register,
   a transparent lens closing said top opening in a direct, water-tight sealing engagement with said wall of said housing, and
   a magnetic-force transmitting element of water impermeable material closing said bottom opening in a direct, water-tight sealing engagement with said wall of said housing,
   the register having a rotatable register element disposed within said cavity adjacent an inner surface of said magnetic-force transmitting element, the rotatable register element adapted to be driven by magnetic coupling with a rotatable meter element disposed adjacent an opposite, outer surface of said magnetic-force transmitting element.

2. The register case of claim 1 wherein said elastomeric material is rubber.

3. The register case of claim 2 wherein said elastomeric material is an ethylene propylene rubber.

4. The register case of claim 1 wherein said housing is a solid, molded rubber material.

5. The register case of claim 1 wherein said housing and said magnetic-force transmitting element are integrally joined in manner to provide a water-tight seal.

6. The register case of claim 1 wherein said wall of said housing, within said cavity, defines a first groove sized and constructed for receiving a base flange of the register, said first groove adapted for engagement with the flange in a manner to secure and position the register within said cavity.

7. The register case of claim 1 wherein said lens defines a flange, and said wall of said housing, within said cavity, defines an annulus sized and constructed for receiving said flange of said lens in water-tight engagement.

8. The register case of claim 7 further comprising means for clamping said wall of said housing about said lens flange to form a water-tight seal.

9. The register case of claim 1 wherein said transparent lens is formed of a water impermeable material resistant to clouding due to prolonged exposure to groundwater and trace chemicals contained therein.

10. The register case of claim 9 wherein said water impermeable transparent lens material is glass.

11. The register case of claim 1 wherein said magnetic-force transmitting element is formed of a magnetically inert material.

12. The register case of claim 11 wherein said magnetically inert material is a copper alloy.

13. The register case of claim 1 wherein said wall of said housing comprises a portion defining a passageway for electrical wires from within said cavity.

14. The register case of claim 13 further comprising means for clamping said portion defining said passageway about the electrical wires to form a water-tight seal.

15. The register of claim 14 further comprising a sealant disposed about the wires in said passageway for sealing said housing about the electrical wires to form a water-tight seal.

16. The register of claim 15 wherein said sealant is caulking compound.

17. The register of claim 14 further comprising a packing material disposed about the wires in said passageway for sealing said housing about the electrical wires to form a water-tight seal.

18. A fluid meter totalizing register assembly suitable for submerged service, comprising:
    a fluid meter totalizing register, and
    a register case;
    said register case comprising:
    a housing comprising a water impermeable elastomeric material defining at least one wall of a cavity, said cavity having a top opening and a bottom opening and defining a volume for receiving and containing therewithin, in a region in between said top opening and said bottom opening, the fluid meter totalizing register,
    a transparent lens closing said top opening in a direct, water-tight sealing engagement with said wall of said housing, and
    a magnetic-force transmitting element of water impermeable material closing said bottom opening in a direct, water-tight sealing engagement with said wall of said housing; and
    said fluid meter totalizing register comprising:
    a rotatable register element disposed within said cavity adjacent an inner surface of said magnetic-force transmitting element, the rotatable register element adapted to be driven by magnetic coupling with a rotatable meter element disposed adjacent an opposite, outer surface of said magnetic-force transmitting element.

19. The register assembly of claim 18 wherein said register has a base flange, and said wall of said housing, within said cavity, defines a first groove sized and constructed for receiving said base flange of said register, said first groove adapted for engagement with said base flange in a manner to secure and position said register within said cavity.

20. The register assembly of claim 18 wherein said lens defines a lens flange, and said wall of said housing, within said cavity, defines an annulus sized and constructed for receiving said lens flange in water-tight engagement.

21. The register assembly of claim 20 further comprising means for clamping said wall of said housing about said lens flange to form a water-tight seal.

22. The register assembly of claim 18 wherein said transparent lens is formed of a water impermeable material resistant to clouding due to prolonged exposure to groundwater and trace chemicals contained therein.

23. The register assembly of claim 22 wherein said water impermeable transparent lens material is glass.

24. The register assembly of claim 18 wherein said magnetic-force transmitting element is formed of a magnetically inert material.

25. The register assembly of claim 24 wherein said magnetically inert material is a copper alloy.

26. The register assembly of claim 18 wherein said wall of said housing comprises a portion defining a passageway for electrical wires from within said cavity.

27. The register assembly of claim 26 further comprising means for clamping said portion defining said passageway about the electrical wires to form a water-tight seal.

28. The register of claim 26 further comprising a sealant disposed about the electrical wires in said passageway for sealing said housing about the electrical wires to form a water-tight seal.

29. The register of claim 28 wherein said sealant is caulking compound.

30. The register of claim 26 further comprising a packing material disposed about the electrical wires in said passageway for sealing said housing about the electrical wires to form a water-tight seal.

31. The register case of claim 18 wherein said elastomeric material is rubber.

32. The register case of claim 31 wherein said elastomeric material is an ethylene propylene rubber.

33. The register case of claim 18 wherein said housing is a solid, molded rubber material.

34. The register case of claim 18 wherein said housing and said magnetic-forcetransmitting element are integrally joined in a manner to provide a water-tight seal.

* * * * *